(12) United States Patent
An et al.

(10) Patent No.: US 10,979,835 B2
(45) Date of Patent: Apr. 13, 2021

(54) METHOD AND APPARATUS FOR TESTING SPEAKER, ELECTRONIC DEVICE AND STORAGE MEDIUM

(71) Applicant: Baidu Online Network Technology (Beijing) Co., Ltd., Beijing (CN)

(72) Inventors: Aihui An, Beijing (CN); Ming Yu, Beijing (CN); Kang Lei, Beijing (CN); Guoguo Chen, Beijing (CN)

( * ) Notice: Subject to any disclaimer, the term of this patent is extended or adjusted under 35 U.S.C. 154(b) by 0 days.

(21) Appl. No.: 16/821,070

(22) Filed: Mar. 17, 2020

(65) Prior Publication Data

US 2021/0058724 A1 Feb. 25, 2021

(30) Foreign Application Priority Data

Aug. 22, 2019 (CN) .......................... 201910780527.3

(51) Int. Cl.
*H04R 29/00* (2006.01)
*H04R 1/40* (2006.01)
*G10L 25/51* (2013.01)
*H04R 3/00* (2006.01)

(52) U.S. Cl.
CPC ............ *H04R 29/001* (2013.01); *G10L 25/51* (2013.01); *H04R 1/406* (2013.01); *H04R 3/005* (2013.01); *H04R 29/005* (2013.01)

(58) Field of Classification Search
None
See application file for complete search history.

(56) References Cited

U.S. PATENT DOCUMENTS

| 2002/0067835 A1* | 6/2002 | Vatter ...................... G01H 7/00 381/58 |
| 2004/0165735 A1* | 8/2004 | Opitz ..................... H04R 1/406 381/92 |
| 2005/0259829 A1* | 11/2005 | Van den Heuvel .. H04R 29/004 381/60 |
| 2007/0291952 A1* | 12/2007 | Spielbauer ............. H04R 29/00 381/26 |
| 2009/0290729 A1* | 11/2009 | Zhang .................. H04R 29/006 381/122 |
| 2017/0289717 A1* | 10/2017 | Little ....................... G06F 3/165 |
| 2019/0149916 A1* | 5/2019 | Takayama ........... G10L 21/0224 381/26 |

(Continued)

FOREIGN PATENT DOCUMENTS

| CN | 101911730 A | 12/2010 |
| CN | 103929707 A | 7/2014 |

(Continued)

*Primary Examiner* — Paul W Huber
(74) *Attorney, Agent, or Firm* — Harness, Dickey & Pierce, P.L.C.

(57) ABSTRACT

The present disclosure discloses a method and an apparatus for testing a speaker, an electronic device and a storage medium. A specific implementation includes: obtaining first audio data recorded by a microphone integrated with the speaker in ambient white noise; analyzing the first audio data to derive a first analysis result; and determining whether there is a defect in the microphone according to the first analysis result. Hence, these allow for testing a completed set on an assembled speaker to ensure the consistency of a microphone test and improve the accuracy of the test result.

17 Claims, 5 Drawing Sheets

(56) References Cited

U.S. PATENT DOCUMENTS

2019/0281398 A1\* 9/2019 Yamaguchi ............ H04R 29/00

FOREIGN PATENT DOCUMENTS

| CN | 104618846 A | 5/2015 |
| --- | --- | --- |
| CN | 107371115 A | 11/2017 |
| CN | 108430023 A | 8/2018 |
| CN | 109104684 A | 12/2018 |
| CN | 109168120 A | 1/2019 |
| CN | 109195090 A | 1/2019 |

\* cited by examiner

METHOD AND APPARATUS FOR TESTING SPEAKER, ELECTRONIC DEVICE AND STORAGE MEDIUM

CROSS-REFERENCE TO RELATED APPLICATION

This application claims priority to Chinese Patent Application No. 201910780527.3, filed on Aug. 22, 2019, which is hereby incorporated by reference in its entirety.

TECHNICAL FIELD

The present disclosure relates to speaker testing technology in the field of voice technology and, in particular, to a method and an apparatus of testing a speaker, an electronic device and a storage medium.

BACKGROUND

In the production of a smart speaker, the most critical is the acoustic quality of speaker hardware. If the acoustic quality fails to meet a standard, effectiveness of voice recognition can be seriously affected. Therefore, in order to ensure the acoustic quality, acoustic verification needs to be applied to the completed set.

At present, a microphone and a loudspeaker of the smart speaker are typically tested separately. That is, the microphone is tested in-situ at the original manufacturer of the microphone, and the loudspeaker is tested for its total harmonic distortion (THD) parameter by an SPK box on the production line.

However, when the completed set is assembled, added structures will affect the consistency of the microphone, especially when the speaker emits sound, the microphone's recording stage cannot be shielded from the impact of harmonic distortion, resulting in inaccurate smart speaker test results.

SUMMARY

The present disclosure provides a method and an apparatus for testing a speaker, an electronic device and a storage medium, which allows for testing a completed speaker as a whole to ensure the consistency of a microphone test and improve the accuracy of the test result.

In a first aspect, an embodiment of the present disclosure provides a method for testing a speaker, including:

obtaining first audio data recorded by a microphone integrated with the speaker in ambient white noise;

analyzing the first audio data to derive a first analysis result; and determining whether there is a defect in the microphone according to the first analysis result.

In this embodiment, first audio data recorded by a microphone integrated with the speaker is obtained in ambient white noise. Then, the first audio data is analyzed to derive a first analysis result. A determination is made regarding whether there is a defect in the microphone according to the first analysis result, where the defect may include all types of defects that can be found in the microphone, such as hardware problem, software problem, etc. Thus, the completed speaker can be tested as a whole, ensuring the consistency in the microphone test and improving the accuracy of the test result.

In a possible design, the obtaining first audio data recorded by a microphone integrated with the speaker in ambient white noise includes:

recording the ambient white noise through at least two microphones on the speaker to obtain the first audio data.

In this embodiment, white noise is recorded through multiple microphones, so that the consistency between the microphones can be analyzed by comparing the audio data of different microphones.

In a possible design, the analyzing the first audio data to derive a first analysis result includes:

obtaining volumes of the first audio data recorded by different microphones.

In a possible design, the determining whether there is a defect in the microphone according to the first analysis result includes:

when a variation between the volumes of the first audio data recorded by different microphones is not within a first threshold range, determining that there is a defect in the microphones of the speaker.

In this embodiment, it is determined whether the hardware of the microphones is normal by making a comparison to see whether a variation between the volumes of the first audio data recorded by different microphones is not within a first threshold range. A smaller variation between the volumes of the first audio data recorded by different microphones means better hardware performance of the microphone.

In a possible design, the method also includes:

when there is a defect in the microphone of the speaker, generating a prompt signal indicating that a test has failed.

In this embodiment, it is convenient for a tester to obtain the test result in a timely and intuitive manner, improving the efficiency in the test.

In a possible design, before the obtaining first audio data recorded by a microphone integrated with the speaker, the method also includes:

loading a white noise file into a memory of the speaker; and controlling, according to a control signal input by a user, a loudspeaker of the speaker to play the white noise file.

In this embodiment, a pre-loaded white noise file is played through a loudspeaker of the speaker in order to simulate the ambient white noise. This facilitates analyzing the performance of the speaker in ambient white noise.

In a possible design, the method also includes:

obtaining second audio data recorded by the microphone integrated with the speaker, where the second audio data is a recording of frequency-sweeping audio played by the loudspeaker integrated with the speaker.

In a possible design, the method also includes:

analyzing the second audio data to derive an acoustic parameter in a preset frequency range, where the acoustic parameter includes: a harmonic distortion parameter, a frequency domain parameter, and a vibration parameter.

In this embodiment, the audio data of different frequency domains can be analyzed for the completed set to obtain acoustic parameters in preset frequency ranges, facilitating comprehensive acoustic quality test for the speaker.

In a possible design, the method also includes:

determining whether all the acoustic parameter meets a requirement; and when there is an acoustic parameter that does not meet the requirement, generating a prompt signal indicating that a test has failed, and feeding back a data plot corresponding to the acoustic parameter.

In this embodiment, various acoustic parameters are compared to assess various performance indicators of the speaker. If there is an acoustic parameter that does not meet its requirement, a prompt signal that indicating failure of the test is generated, and a data plot corresponding to the acoustic parameter is fed back, thereby providing convenience to the tester for analyzing the test result, and improving the efficiency of the test and the accuracy of the test result.

In a second aspect, an embodiment of the present disclosure provides an apparatus for testing a speaker, including:

an acquiring module, configured to obtain first audio data recorded by a microphone integrated with the speaker in ambient white noise;

an analyzing module, configured to analyze the first audio data to derive a first analysis result; and a processing module, configured to determine whether there is a defect in the microphone according to the first analysis result.

In this embodiment, first audio data recorded by a microphone integrated with the speaker is obtained in ambient white noise. Then, the first audio data is analyzed to derive a first analysis result. A determination is made regarding whether there is a defect in the microphone according to the first analysis result. Hence, these can implement testing a completed set on an assembled speaker to ensure the consistency of a microphone test and improve the accuracy of the test result.

In a possible design, the obtaining module is specifically configured to:

record the ambient white noise through at least two microphones on the speaker to obtain the first audio data.

In this embodiment, white noise is recorded through multiple microphones, so that the consistency between the microphones can be analyzed by comparing the audio data of different microphones.

In a possible design, the analyzing module is specifically configured to:

obtain volumes of the first audio data recorded by different microphones.

In a possible design, the determining module is specifically configured to:

when a variation between the volumes of the first audio data recorded by different microphones is not within a first threshold range, determining that there is a defect in the microphone of the speaker.

In this embodiment, it is determined whether the hardware of the microphone is normal by making a comparison to see whether a variation between the volumes of the first audio data recorded by different microphones is not within a first threshold range. A smaller variation between the volumes of the first audio data recorded by different microphones means better hardware performance of the microphone.

In a possible design, the apparatus also includes: a prompting module, configured to:

when there is a defect in the microphone of the speaker, generate a prompt signal indicating that the test has failed.

In this embodiment, it is convenient for a tester to obtain the test result in a timely and intuitive manner, improving the efficiency in the test.

In a possible design, the apparatus also includes: a processing module, configured to:

load a white noise file into a memory of the speaker; and control a loudspeaker of the speaker to play the white noise file, according to a control signal input by a user.

In this embodiment, a pre-loaded white noise file is played through a loudspeaker of the speaker in order to simulate the ambient white noise. This facilitates analyzing the performance of the speaker in ambient white noise.

In a possible design, the obtaining module is further configured to:

obtain second audio data recorded by the microphone integrated with the speaker, where the second audio data is a recording of frequency-sweeping audio played by the loudspeaker integrated with the speaker.

In a possible design, the analyzing module is further configured to:

analyze the second audio data to derive an acoustic parameter in a preset frequency range, where the acoustic parameter includes: a harmonic distortion parameter, a frequency domain parameter, and a vibration parameter.

In this embodiment, the audio data of different frequency domains can be analyzed for the completed set to obtain the acoustic parameter in preset frequency ranges, facilitating comprehensive acoustic quality test for the speaker.

In a possible design, the analyzing module is further configured to:

assess whether all the acoustic parameter meets a requirement; and when there is an acoustic parameter that does not meet the requirement, generate a prompt signal indicating that the test has failed, and feed back a data plot corresponding to the acoustic parameter.

In this embodiment, various acoustic parameters are compared to assess various performance indicators of the speaker. If there is an acoustic parameter that does not meet its requirement, a prompt signal indicating failure of the test is generated, and a data plot corresponding to the acoustic parameter is fed back, thereby providing convenience to the tester for analyzing the test result and improving the efficiency of the test and the accuracy of the test result.

In a third aspect, the present disclosure provides an electronic device, including: a processor, and a memory storing thereon instructions executable by the processor, where the processor is configured to execute the executable instructions to implement the method for testing a speaker according to any one of the first aspect.

In a fourth aspect, the present disclosure provides a computer-readable storage medium, storing thereon a computer program which, when executed by a processor, enables implementing the method for testing a speaker according to any one of the first aspect.

According to a fifth aspect, an embodiment of the present disclosure provides a program product. The program product includes a computer program stored in a readable storage medium, and at least one processor of a computer can read, from the readable storage medium, the computer program which, when executed by the at least one processor, causes the computer to implement the method for testing a speaker according to any one of the first aspect.

One of the foregoing embodiments of the disclosure has the following advantages or beneficial effects: a technical means has been introduced to obtain first audio data recorded by a microphone integrated with the speaker in ambient white noise, analyze the first audio data to derive a first analysis result, and determine whether there is a defect in the microphone according to the first analysis result, and accordingly, a technical problem in existing means associated with inaccurate result from acoustic quality test on the speaker has been overcome, thereby achieving the technical effect of implementing the test of a completed set on an assembled speaker to ensure the consistency of a microphone test and improving the accuracy of the test result.

Other effects that the foregoing optional implementation might have will be described below with reference to specific embodiments.

BRIEF DESCRIPTION OF DRAWINGS

The drawings are used to facilitate understanding of the present solution, and do not constitute any limitation on the present disclosure. In the drawings.

DETAILED DESCRIPTION

Figure 1:
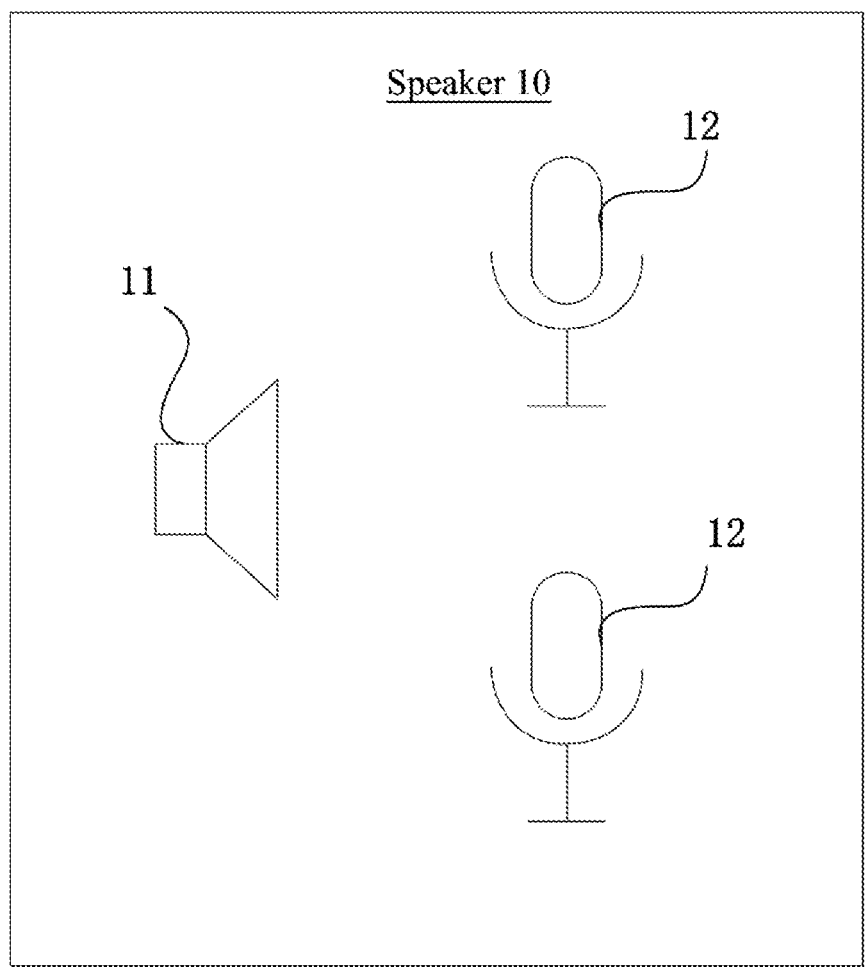
FIG. 1 is a schematic diagram illustrating an disclosure scenario for a method for testing a speaker according to an embodiment of the present disclosure.

Now, exemplary embodiments of the present disclosure will be described with reference to the accompanying drawings, which include various details of the embodiments of the present disclosure to facilitate understanding, and shall be considered as merely exemplary. Therefore, those of ordinary skill in the art should appreciate that various changes and modifications can be made to the embodiments described herein without departing from the scope and spirit of the present disclosure. Also, for clarity and conciseness, descriptions of well-known functions and structures are omitted in the following description.

Now, exemplary embodiments of the present disclosure will be described with reference to the accompanying drawings, which include various details of the embodiments of the present disclosure to facilitate understanding, and shall be considered as merely exemplary. Therefore, those of ordinary skill in the art should appreciate that various changes and modifications can be made to the embodiments described herein without departing from the scope and spirit of the present disclosure. Also, for clarity and conciseness, descriptions of well-known functions and structures are omitted in the following description.

The terms "first", "second", "third", "fourth", etc. (if present) in the specification and claims of the present disclosure and the aforementioned drawings are used to distinguish similar objects without necessarily describing any specific sequence or order. It is to be understood that the number used as such may be interchanged as appropriate, as long as the embodiments of the disclosure described herein can be implemented, for example, in a sequence other than those illustrated or described herein. In addition, the terms "include" and "have" and their variations in any form are intended to cover a non-exclusive inclusion. For example, a process, method, system, product or device that "includes" a series of steps or units is not necessarily limited to those enlisted steps or units. Rather, they may include other steps or units not explicitly listed or inherent to such process, method, system, product or device.

Now, the technical solution of the present disclosure will be detailed with reference to specific embodiments. The following specific embodiments may be recombined with each other, and the same or similar concepts or processes may not be repeated in some embodiments.

A smart speaker is one of the next generation product of traditional speaks, which includes a speaker and a microphone. User's voice control instructions can be obtained by the microphone and recognized by a voice recognition algorithm, so as to play a corresponding song or achieve smart control. In the production of a smart speaker, the most critical is the acoustic quality of the speaker hardware. If the acoustic quality fails to meet a standard, effectiveness of voice recognition can be seriously affected. Therefore, in order to ensure the acoustic quality, acoustic verification need to be applied to the completed set.

At present, a microphone and a loudspeaker of the smart speaker are typically tested separately. That is, the microphone is tested in-situ at the original manufacturer of the microphone, and the loudspeaker is tested for its total harmonic distortion (THD) parameter by an SPK box on the production line.

However, when the completed set is assembled, added structures will affect the consistency of the microphone, especially when the speaker emits sound, the microphone's recording stage cannot be shielded from the impact of harmonic distortion, resulting in inaccurate smart speaker test results.

In view of the above technical problems, the present disclosure provides a method and an apparatus for testing a speaker, an electronic device and a storage medium, which allows for testing a completed speaker as a whole to ensure the consistency of a microphone test and improve the accuracy of the test result.

FIG. 1 is a schematic diagram illustrating an application scenario for a method for testing a speaker according to an embodiment of the present disclosure. As shown in FIG. 1, the speaker 10 is a completed device, and is provided with a loudspeaker 11 and microphones 12. During a test, a pre-loaded white noise file is firstly played by the loudspeaker 11 of the speaker 10 (if the speaker is already in an environment with white noise, the microphone test can be performed straightaway). Then, two microphones 12 record the played white noise at the same time to provide two groups of recordings. The volumes of the two groups of recordings are compared with each other. If the variation between the volumes is within a preset first threshold range, it is determined that the microphones of the speaker are not defective. If the variation between the volumes is not within a preset first threshold range, it is determined that the microphone of the speaker is defective. The first threshold range can be adaptively chosen as actually needed in the test.

The above method can implement testing a completed set on an assembled speaker to ensure the consistency of a microphone test and improve the accuracy of the test result.

Similarly, besides the above method, it is also possible to play a frequency-sweeping audio through the loudspeaker 11 and record the frequency-sweeping audio through the microphone 12 to obtain a frequency-sweeping audio recording, which may then be analyzed to derive an acoustic parameter in a preset frequency range. The acoustic parameter may include: a harmonic distortion parameter, a frequency domain parameter, and a vibration parameter, etc., which reflect the acoustic performance of the speaker.

By applying the above method, the microphone and/or harmonic distortion test stages can be arranged after the completed set has been assembled. Accordingly, the white noise can be played and recorded by the completed set to obtain the audio data for testing the microphone. Alternatively, the frequency sweep can be played and recorded by the completed set to obtain the audio data for harmonic distortion test of the completed set. Then, the acoustic quality test result of the completed set can be derived based on the analysis result of the audio data. The entire test operation is simple and efficient.

Figure 2:
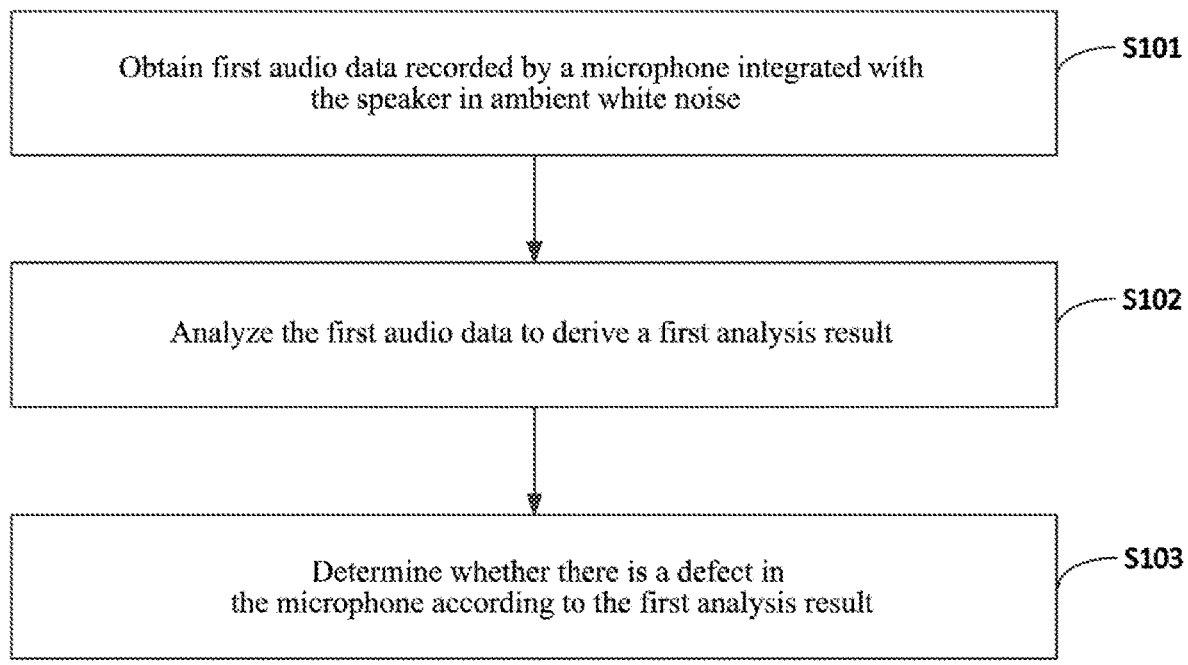
FIG. 2 is a schematic diagram according to a first embodiment of the present disclosure.

FIG. 2 is a schematic diagram according to a first embodiment of the present disclosure. As shown in FIG. 2, the method in this embodiment may include:

S101: obtain first audio data recorded by a microphone integrated with the speaker in ambient white noise.

In this embodiment, the ambient white noise is recorded through at least two microphones on the completed speaker to obtain the first audio data.

Specifically, elementary parts of the microphone of the speaker have undergone tests, but when the completed set has been assembled, added arrangement could potentially affect the consistency of the microphones, so the consistency of the microphones of the speaker needs to be tested. The ambient white noise can be created by playing white noise through an external speaker or the speaker itself. Then, the ambient white noise is recorded by multiple microphones of the speaker simultaneously to obtain the first audio data.

Optionally, before the obtaining first audio data recorded by the microphone integrated with the speaker, this embodiment also includes: loading a white noise file into a memory of the speaker; and controlling a loudspeaker of the speaker to play the white noise file, according to a control signal input by a user.

Specifically, after the completed set of speaker has been assembled, the white noise file to be played and the test program can be packaged into the firmware of the speaker in advance. After the whole package is burned in the factory, the system is restarted, and the speaker can be triggered with one touch, enabling white noise to be played through the loudspeaker of the speaker while being recorded by the microphones integrated with the speaker, that is, the playing and recording are performed by the speaker itself. This approach does not require any external speaker because the playing and recording are accomplished by the speaker itself, thus offering simple operation and high efficiency.

S102: analyze the first audio data to derive a first analysis result.

In this embodiment, volumes of the first audio data recorded by different microphones are obtained. It is determined whether the microphones have a defect through the volumes of the first audio data recorded by different microphones, where the defect may include all possible defect types of the microphone, such as a hardware problem, a software problem, and the like.

S103: determine whether there is a defect in the microphone according to the first analysis result.

In this embodiment, the volumes of the first audio data recorded by the different microphones should be substantially the same. A smaller variation between the volumes of the first audio data recorded by different microphones means better hardware performance of the microphones. When the variation between the volumes of the first audio data recorded by different microphones is not within a first threshold range, it can be determined that there is a defect in the microphones of the speaker. For example, when the difference between the volumes of the white noise recorded by multiple microphones is more than 3 dB, it can be determined that there is a defect.

Optionally, when there is a defect in the microphone of the speaker, a prompt signal may be generated to indicate that the test has failed.

Specifically, when there is a defect in the microphone of the speaker, the prompt signal indicating test failure can be generated to facilitate the tester to obtain the test result in a timely and intuitive manner, so as to improve the test efficiency. The prompt signal can be a control signal. For example, a test-pass and test-failure signal can be sent to assembly line control software and be displayed in red or green. The prompt signal may also be a voice message, e.g., a pre-determined "speaker test failure" voice message played on the speaker itself.

In this embodiment, first audio data recorded by a microphone integrated with the speaker is obtained in ambient white noise, the first audio data is analyzed to derive a first analysis result, and determination is made regarding whether there is a defect in the microphone according to the first analysis result. Hence, these allow for testing a completed set on an assembled speaker to ensure the consistency of a microphone test and improve the accuracy of the test result.

Figure 3:
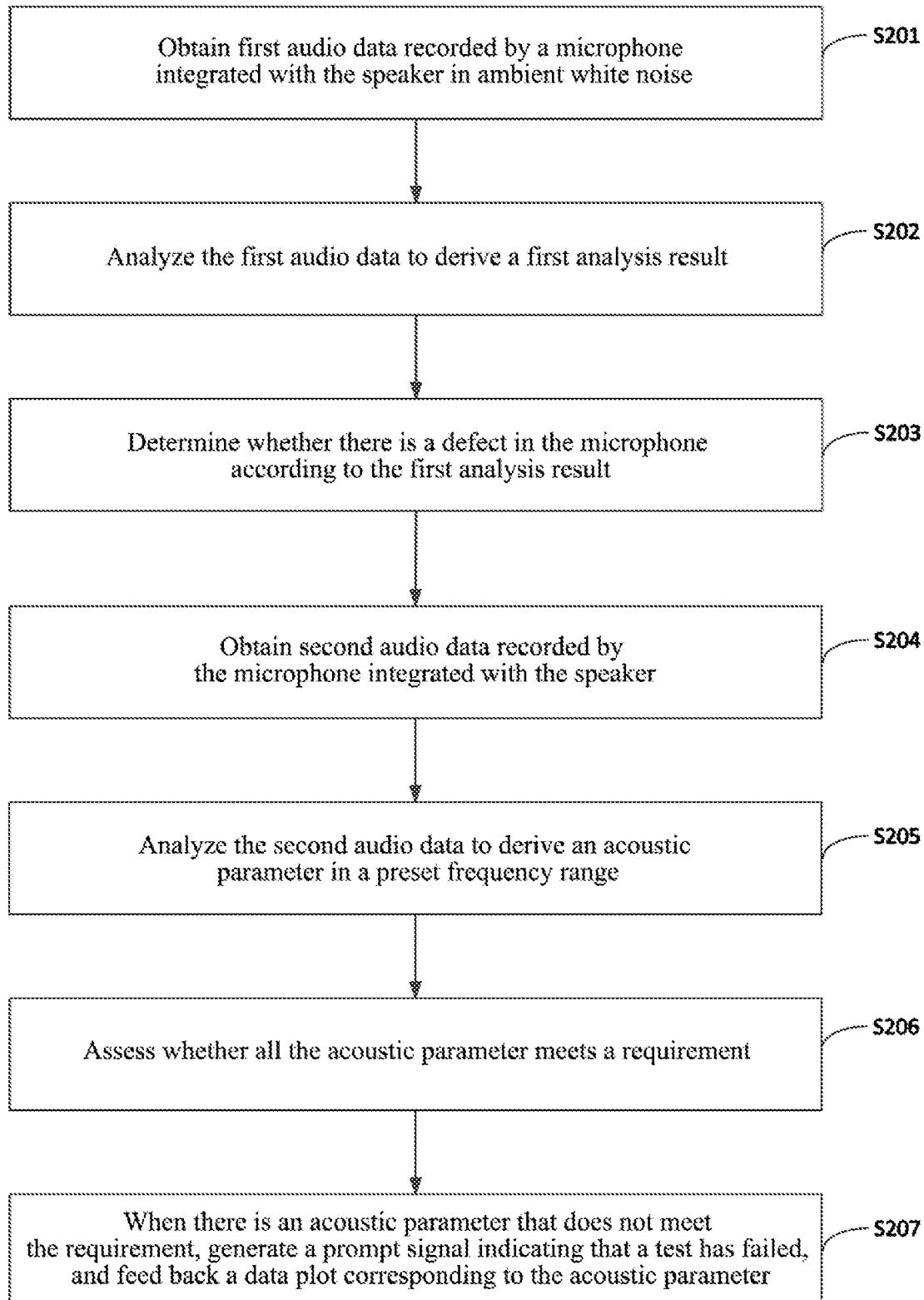
FIG. 3 is a schematic diagram according to a second embodiment of the present disclosure.

FIG. 3 is a schematic diagram according to a second embodiment of the present disclosure. As shown in FIG. 3, the method in this embodiment may include:

S201: obtain first audio data recorded by a microphone integrated with the speaker in ambient white noise.

S202: analyze the first audio data to derive a first analysis result.

S203: determine whether there is a defect in the microphone according to the first analysis result.

For specific implementation processes and principles of steps S201 to S203 in this embodiment, refer to related descriptions in the method shown in FIG. 2, and details of which will not be repeated herein.

S204: obtain second audio data recorded by the microphone integrated with the speaker.

In this embodiment, the harmonic distortion (THD) test of the completed speaker can be additionally performed. A frequency-sweeping audio is played by a loudspeaker integrated with the speaker, and recorded by the microphone of the speaker to obtain second audio data.

Specifically, the frequency-sweeping audio file to be played and the test program can be packaged into the firmware of the speaker in advance. After the whole package has been burned in the factory, the system is started, and the speaker is triggered with one touch, enabling frequency-sweeping audio to be played through the loudspeaker of the speaker while being recorded by the microphone integrated with the speaker, that is, the playing and recording are performed by the product itself. Thus, the second audio data is obtained. The frequency-sweeping audio can be in the frequency range of 200 hz to 16 khz.

S205: analyze the second audio data to derive an acoustic parameter in a preset frequency range.

In this embodiment, the second audio data may be analyzed to derive an acoustic parameter in a preset frequency range. The acoustic parameter may include: a harmonic distortion parameter, a frequency domain parameter, and a vibration parameter.

Specifically, the test program analyzes the recorded audio, including testing whether there is vibration, distortion and frequency domain clipping in the 200 hz to 16 khz frequency range. A threshold for the distortion can be configured according to the actual frequency range. Thus, defect can be identified in the completed set in the given frequency-sweeping setting.

S206: assess whether the acoustic parameter meets a requirement.

In this embodiment, thresholds can be set for various indicators according to the frequency range. If an indicator of the speaker exceeds its threshold, the test has failed.

S207: when there is an acoustic parameter that does not meet the requirement, generate a prompt signal indicating that the test has failed, and feed back a data plot corresponding to the acoustic parameter.

In this embodiment, when there is an acoustic parameter that does not meet the requirement, a prompt signal is generated to indicate that the test has failed. Meanwhile, an output can also be generated to show which test item has failed and the complete data that failed in the test, and a data plot of the acoustic parameter can be shown as a curve through windows.

In this embodiment, first audio data recorded by a microphone integrated with the speaker is obtained in ambient white noise, the first audio data is analyzed to derive a first analysis result, and determination is made regarding whether there is a defect in the microphone according to the first analysis result. Hence, these allow for testing a completed set on an assembled speaker to ensure the consistency of a microphone test and improve the accuracy of the test result.

In addition, this embodiment can also obtain second audio data recorded by the microphone integrated with the speaker; analyze the second audio data to derive an acoustic parameter in a preset frequency range; assess whether the acoustic parameter meets a requirement; and when there is an acoustic parameter that does not meet the requirement, generate a prompt signal indicating that the test has failed, and feed back a data plot corresponding to the acoustic parameter. Hence, these allow for testing a completed set on an assembled speaker to ensure the consistency of a microphone test and improve the accuracy of the test result.

Figure 4:
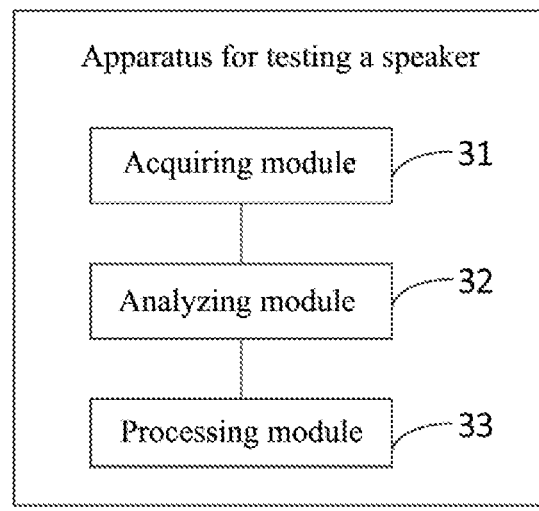
FIG. 4 is a schematic diagram according to a third embodiment of the present disclosure.

FIG. 4 is a schematic diagram according to a third embodiment of the present disclosure. As shown in FIG. 4, the apparatus in this embodiment may include:

an acquiring module 31, configured to obtain first audio data recorded by a microphone integrated with the speaker in ambient white noise;

an analyzing module 32, configured to analyze the first audio data to derive a first analysis result; and a processing module 33, configured to determine whether there is a defect in the microphone according to the first analysis result.

In a possible design, the obtaining module 31 is specifically configured to:

record the ambient white noise through at least two microphones on the speaker to derive the first audio data.

In a possible design, the analyzing module 32 is specifically configured to:

obtain volumes of the first audio data recorded by different microphones.

In a possible design, the processing module 33 is specifically configured to:

when a variation between the volumes of the first audio data recorded by different microphones is not within a first threshold range, determine that there is a defect in the microphones of the speaker.

In a possible design, the processing module 33 is also configured to:

load a white noise file into a memory of the speaker; and control a loudspeaker of the speaker to play the white noise file, according to a control signal input by a user.

In a possible design, the obtaining module 31 is further configured to:

obtain second audio data recorded by the microphone integrated with the speaker, where the second audio data is a recording of frequency-sweeping audio played by the loudspeaker integrated with the speaker.

In a possible design, the analyzing module 32 is further configured to:

analyze the second audio data to derive an acoustic parameter in a preset frequency range, where the acoustic parameter includes: a harmonic distortion parameter, a frequency domain parameter, and a vibration parameter.

In a possible design, the processing module 33 is further configured to:

assess whether all the acoustic parameter meets a requirement; and when there is an acoustic parameter that does not meet the requirement, generate a prompt signal indicating that the test has failed, and feed back a data plot corresponding to the acoustic parameter.

The apparatus for testing a speaker according to this embodiment can implement the technical solutions in the methods shown in FIG. 2 and FIG. 3. For the specific implementation process and technical principle, refer to the related description in the methods shown in FIG. 2 and FIG. 3, which will not be repeated herein.

In this embodiment, first audio data recorded by a microphone integrated with the speaker is obtained in ambient white noise, the first audio data is analyzed to derive a first analysis result, and determination is made regarding whether there is a defect in the microphone according to the first analysis result. Hence, these allow for testing a completed set on an assembled speaker to ensure the consistency of a microphone test and improve the accuracy of the test result.

Figure 5:
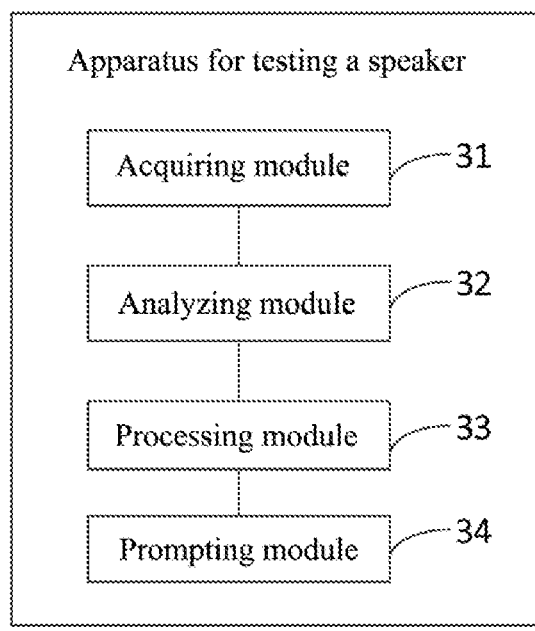
FIG. 5 is a schematic diagram according to a fourth embodiment of the present disclosure.

FIG. 5 is a schematic diagram according to a fourth embodiment of the present disclosure. As shown in FIG. 5, the apparatus in this embodiment may, on the basis of the apparatus shown in FIG. 4, further include:

a prompting module 34, configured to:

when there is a defect in the microphone of the speaker, generate a prompt signal indicating that the test has failed.

In this embodiment, it is convenient for a tester to obtain the test result in a timely and intuitive manner, improving the efficiency in the test.

The apparatus for testing a speaker according to this embodiment can implement the technical solutions in the methods shown in FIG. 2 and FIG. 3. For the specific implementation process and technical principle, refer to the related description in the methods shown in FIG. 2 and FIG. 3, which will not be repeated herein.

In this embodiment, first audio data recorded by a microphone integrated with the speaker is obtained in ambient white noise, the first audio data is analyzed to derive a first analysis result, and determination is made regarding whether there is a defect in the microphone according to the first analysis result. Hence, these allow for testing a completed set on an assembled speaker to ensure the consistency of a microphone test and improve the accuracy of the test result.

According to an embodiment of the present disclosure, an electronic device and a readable storage medium are also provided.

Figure 6:
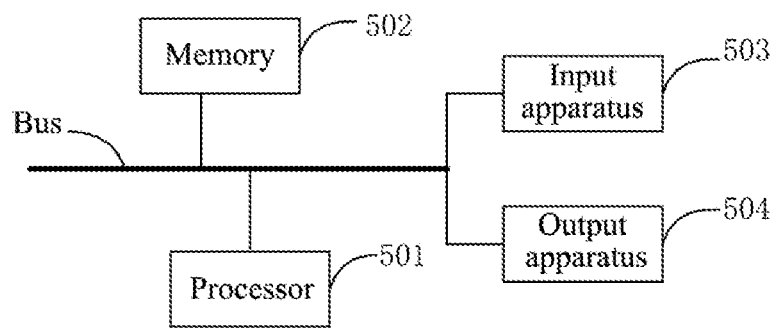
FIG. 6 is a block diagram illustrating an electronic device for implementing a method for testing a speaker according to an embodiment of the present disclosure.

FIG. 6 is a block diagram illustrating an electronic device for implementing a method for testing a speaker according to an embodiment of the present disclosure. As shown in FIG. 6, a block diagram illustrates an electronic device for implementing a method for testing a speaker according to an embodiment of the present disclosure. The electronic device is intended to represent a digital computer in various forms, such as a laptop computer, a desktop computer, a workstation, a personal digital assistant, a computer, a blade server, a mainframe, and/or other appropriate computers. The electronic device may also represent a mobile device in various forms, such as a personal digital assistant, a cellular phone, a smart phone, a wearable device, and/or other similar computing devices. The components, their connections and relationships, and their functions as illustrated herein are merely examples, and are not intended to limit the implementation of the disclosure described and/or required herein.

As shown in FIG. 6, the electronic device includes: one or more processors 501, a memory 502, and interfaces for connecting various components, including a high-speed interface and a low-speed interface. The various components are interconnected via different buses and can be mounted on a common motherboard or otherwise installed as required. The processors can process instructions executed within the electronic device, including instructions stored in or on the memory for displaying graphical information of the GUI (graphic user interface) on an external input/output apparatus, such as a display apparatus coupled to the interface. In other embodiments, multiple processors and/or buses can be used with multiple memories, if desired. Similarly, multiple electronic devices can be joined together, e.g., as a server array, a group of blade servers or a multiprocessor system, with each device providing some of the necessary operations. One processor 501 is illustrated as an example in FIG. 6.

The memory 502 is a non-transitory computer-readable storage medium provided by the present disclosure. The memory stores instructions executable by the at least one processor to enable the least one processor to implement the method for testing a speaker provided in the present disclosure. The non-transitory computer-readable storage medium of the present disclosure stores computer instructions which are used to cause a computer to implement the method for testing a speaker provided in the present disclosure.

The memory 502 is a non-transitory computer-readable storage medium which can be used to store non-transitory software programs, non-transitory computer executable programs and modules, such as program instructions/modules corresponding to the method for testing a speaker in the embodiment of the present disclosure. The processor 501 runs the non-transitory software programs, instructions and modules stored in the memory 502 to execute various functional applications and data processing for the computer, i.e., implementing the method for testing a speaker in the foregoing method embodiments.

The memory 502 may include a program storage partition and a data storage partition, where the program storage partition may store an operating system and an application program required for at least one function, and the data storage partition may store data created for use by the electronic device according to the method for testing a speaker. In addition, the memory 502 may include a high-speed random-access memory, and may also include a non-transitory memory, such as at least one magnetic disk storage device, a flash memory device, or other non-transitory solid-state storage device. In some embodiments, the memory 502 may optionally include a memory remotely disposed with respect to the processor 501, and the remote memory may be connected through a network to the electronic device of the method for testing a speaker. Examples of the above network include, but are not limited to, the Internet, an Intranet, a local area network, a mobile communication network and combinations thereof.

The electronic device for testing a speaker may further include an input apparatus 503 and an output apparatus 504.

The processor 501, the memory 502, the input apparatus 503, and the output apparatus 504 may be connected via a bus or other means. FIG. 6 has illustrated a connection via a bus as an example.

The input apparatus 503 can receive inputted numeric or character information, and generate a key signal input related to a user setting and function control of an electronic device for testing a speaker, such as a touch screen, a keypad, a mouse, a trackpad, a touchpad, a pointing stick, one or more mouse buttons, a trackball, a joystick or the like. The output apparatus 504 may include a display apparatus, an auxiliary lighting apparatus (e.g., an LED), a haptic feedback apparatus (e.g., a vibration motor) and the like. The display apparatus may include, but is not limited to, a liquid crystal display (LCD), a light emitting diode (LED) display, and a plasma display. In some embodiments, the display apparatus may be a touch screen.

Various implementations of the systems and technologies described herein may be implemented in a digital electronic circuitry, an integrated circuit system, an application-specific integrated circuit (ASIC), computer hardware, firmware, software, and/or combinations thereof. These various embodiments may include: implementations in one or more computer programs, which can be executed by and/or interpreted on a programmable system including at least one programmable processor, the programmable processor may be application specific or general-purpose and can receive data and instructions from a storage system, at least one input apparatus and/or at least one output apparatus, and can transmit the data and instructions to the storage system, the at least one input apparatus, and the at least one output apparatus.

These computing programs (also known as programs, software, software applications or codes) include machine instructions of a programmable processor, and can be implemented using high-level procedures and/or object-oriented programming languages, and/or assembly/machine languages. As used herein, the terms "machine-readable medium" and "computer-readable medium" both refer to any computer program product, apparatus, and/or apparatus (e.g., a magnetic disk, an optical disk, a memory, a programmable logic device (PLD)) used to provide the machine instructions and/or data to a programmable processor, including machine-readable media that receive machine instructions as machine-readable signals. The term "machine-readable signal" refers to any signal used to provide machine instructions and/or data to a programmable processor.

To provide interaction with the user, the systems and technologies described herein can be implemented on a computer that has: a display apparatus (e.g., a cathode ray tube (CRT) or liquid crystal display (LCD) monitor) for displaying information to the user; and a keyboard and a pointing apparatus (e.g., a mouse or a trackball) through which the user can provide input to the computer. Other kinds of devices may also be used to provide interaction with the user. For example, the feedback provided to the user may be any form of sensory feedback (e.g., a visual feedback, an auditory feedback, or a haptic feedback), and may be in any form (including an acoustic input, a voice input, or a haptic input) to receive input from the user.

The systems and technologies described herein can be implemented in a computing system that includes a back-end component (e.g., as a data server), or a middleware components (e.g., an application server), or a front-end component (e.g., a user computer with a graphical user interface or web browser through which the user can interact with the implementation of the systems and technologies described herein), or any combination of such back-end component, middleware component or front-end component. Various components of the system may be interconnected by digital data communication in any form or via medium (e.g., a communication network). Examples of a communication network include: a local area network (LAN), a wide area network (WAN) and the Internet.

The computer system may include a client and a server. The client and server are typically remote from each other and interact via a communication network. The client-server relationship is created by computer programs running on respective computers and having a client-server relationship with each other.

It should be understood that the various forms of processes shown above may be used, and steps may be reordered, added or removed. For example, various steps described in the present disclosure can be executed in parallel, in sequence, or in alternative orders. As long as the desired results of the technical solutions disclosed in the present disclosure can be achieved, no limitation is imposed herein.

The foregoing specific implementations do not constitute any limitation on the protection scope of the present disclosure. It should be understood by those skilled in the art that various modifications, combinations, sub-combinations and substitutions may be made as needed by design requirements and other factors. Any and all modification, equivalent substitution, improvement or the like within the spirit and concept of the present disclosure shall fall within the protection scope of the present disclosure.

What is claimed is:

1. A method for testing a speaker, comprising:
   recording an ambient white noise through at least two microphones on the speaker to obtain first audio data in the ambient white noise;
   obtaining volumes of the first audio data recorded by different microphones;
   when a variation between the volumes of the first audio data recorded by different microphones is not within a first threshold range, determining that there is a defect in the microphones of the speaker.

2. The method according to claim 1, further comprising:
   when there is a defect in the microphone of the speaker, playing a pre-determined voice message on the speaker itself as a prompt signal indicating that a test has failed.

3. The method according to claim 1, wherein, before the obtaining volumes of the first audio data recorded by different microphones, the method further comprises:
   loading a white noise file into a memory of the speaker; and
   controlling, according to a control signal input by a user, a loudspeaker of the speaker to play the white noise file.

4. The method according to claim 1, further comprising:
   obtaining second audio data recorded by the microphone integrated with the speaker, wherein the second audio data is a recording of frequency-sweeping audio played by a loudspeaker integrated with the speaker, wherein, the frequency-sweeping audio is in a frequency range of 200 hz to 16 khz;
   analyzing the second audio data to derive acoustic parameters in a preset frequency range, wherein the acoustic parameters comprise: a harmonic distortion parameter, a frequency domain parameter, and a vibration parameter;
   assessing whether all the acoustic parameters meet a requirement; and
   when there is an acoustic parameter that does not meet the requirement, generating a prompt signal indicating that a test has failed, and feeding back a data plot corresponding to the acoustic parameters.

5. The method according to claim 1, further comprising:
   when the variation between the volumes of the first audio data recorded by different microphones is more than 3 dB, determining that there is a defect in the microphones of the speaker.

6. The method according to claim 3, wherein, before the obtaining volumes of the first audio data recorded by different microphones, the method further comprises:
   after a completed set of speaker has been assembled, the white noise file and a test program are packaged into a firmware of the speaker in advance.

7. The method according to claim 4, further comprising:
   when there is an acoustic parameter that does not meet the requirement, playing a predetermined voice message on the speaker itself as a prompt signal indicating that the test has failed and feeding back the data plot corresponding to the acoustic parameter.

8. The method according to claim 4, further comprising:
   a frequency-sweeping audio file to be played and a test program being packaged into a firmware of the speaker in advance.

9. A non-transitory computer readable storage medium, storing thereon computer instructions that are used to enable a computer to implement the method according to claim 1.

10. An electronic device, comprising:
    at least one processor; and
    a memory in communication with the at least one processor, wherein:
    the memory stores instructions that are executable by the at least one processor to enable the at least one processor to:
    record an ambient white noise through at least two microphones on a speaker to obtain first audio data in the ambient white noise;
    obtain volumes of the first audio data recorded by different microphones;
    determine that there is a defect in the microphones of the speaker when a variation between the volumes of the first audio data recorded by different microphones is not within a first threshold range.

11. The electronic device according to claim 10, wherein the processor is further enabled to play a pre-determined voice message on the speaker itself as a prompt signal indicating that a test has failed when there is a defect in the microphone of the speaker.

12. The electronic device according to claim 10, wherein the processor is further enabled to:
    load a white noise file into a memory of the speaker; and
    control, according to a control signal input by a user, a loudspeaker of the speaker to play the white noise file.

13. The electronic device according to claim 10, wherein the processor is further enabled to obtain second audio data recorded by the microphone integrated with the speaker, wherein the second audio data is a recording of frequency-sweeping audio played by a loudspeaker integrated with the speaker, wherein, the frequency-sweeping audio is in a frequency range of 200 hz to 16 khz;
    analyze the second audio data to derive acoustic parameters in a preset frequency range, wherein the acoustic parameters comprise: a harmonic distortion parameter, a frequency domain parameter, and a vibration parameter;

assess whether all the acoustic parameters meet a requirement; and generate a prompt signal indicating that a test has failed and feed back a data plot corresponding to the acoustic parameters when there is an acoustic parameter that does not meet the requirement.

14. The electronic device according to claim 10, wherein the processor is further enabled to determine that there is a defect in the microphones of the speaker when the variation between the volumes of the first audio date recorded by different microphones is more than 3 dB.

15. The electronic device according to claim 12, wherein the processor is further enabled to package the white noise file and a test program into a firmware of the speaker in advance after a completed set of speaker has been assembled.

16. The electronic device according to claim 13, wherein the processor is further enabled to play a pre-determined voice message on the speaker itself as the prompt signal indicating that the test has failed and feedback the data plot corresponding to the acoustic parameters when there is an acoustic parameter that does not meet the requirement.

17. The electronic device according to claim 13, wherein the processor is further enabled to package a frequency-sweeping audio file to be played and a test program into a firmware of the speaker in advance.

* * * * *